US010609692B2

(12) United States Patent
Chakraborty et al.

(10) Patent No.: US 10,609,692 B2
(45) Date of Patent: Mar. 31, 2020

(54) COMMUNICATION DEVICE AND METHOD FOR WIRELESS COMMUNICATIONS

(71) Applicant: Intel IP Corporation, Santa Clara, CA (US)

(72) Inventors: Soumen Chakraborty, Bangalore (IN); Phani Boddapati, Bangalore (IN)

(73) Assignee: Apple Inc., Cupertino, CA (US)

( * ) Notice: Subject to any disclaimer, the term of this patent is extended or adjusted under 35 U.S.C. 154(b) by 328 days.

(21) Appl. No.: 15/252,242

(22) Filed: Aug. 31, 2016

(65) Prior Publication Data

US 2018/0063817 A1 Mar. 1, 2018

(51) Int. Cl.
*H04W 72/04* (2009.01)
*H04W 74/08* (2009.01)
*H04W 16/14* (2009.01)
*H04W 88/06* (2009.01)
*H04W 84/12* (2009.01)

(52) U.S. Cl.
CPC ..... *H04W 72/042* (2013.01); *H04W 74/0816* (2013.01); *H04W 16/14* (2013.01); *H04W 84/12* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 2007/0042777 A1* | 2/2007 | Govindarajan | ....... | H04W 68/12 455/435.2 |
| 2011/0032114 A1* | 2/2011 | Egawa | ..................... | G08B 7/06 340/691.4 |
| 2012/0250551 A1* | 10/2012 | Sartori | .................. | H04W 48/12 370/252 |
| 2012/0314637 A1* | 12/2012 | Kim | ...................... | H04L 1/1851 370/311 |
| 2012/0329515 A1* | 12/2012 | Husted | ................ | H04W 52/226 455/552.1 |
| 2015/0117342 A1* | 4/2015 | Loehr | ............... | H04W 72/1284 370/329 |
| 2015/0201456 A1* | 7/2015 | Lee | .................... | H04W 52/0216 370/311 |
| 2016/0037439 A1* | 2/2016 | Shamis | ................ | H04W 48/16 370/329 |

(Continued)

FOREIGN PATENT DOCUMENTS

| | | |
|---|---|---|
| KR | 1020150128234 A | 11/2015 |
| WO | 0201837 A2 | 1/2002 |
| WO | 2016072776 A1 | 5/2016 |

OTHER PUBLICATIONS

Ericsson, "PDCCH subframes in LAA", R2-156694, Nov. 16-20, 2015, 3GPP TSG-RAN WG2 #92, Anaheim, USA.

(Continued)

*Primary Examiner* — Otis L Thompson, Jr.

(57) ABSTRACT

A communication device and a method to suspend monitoring of a first radio access network (RAN) on a frequency band shared with a second RAN, comprising receiving a signal from the second RAN on the frequency band; decoding the received signal; identifying a duration during which the second RAN occupies the frequency band based on the decoded signal; and suspending monitoring of the control channel of the first RAN on the frequency band for at least the identified duration.

26 Claims, 12 Drawing Sheets

(56) References Cited

U.S. PATENT DOCUMENTS

| | | | |
|---|---|---|---|
| 2016/0095110 A1* | 3/2016 | Li | H04W 72/1215 |
| | | | 370/329 |
| 2016/0135080 A1* | 5/2016 | Pazhyannur | H04W 16/14 |
| | | | 370/329 |
| 2016/0135137 A1 | 5/2016 | Dalsgaard et al. | |
| 2016/0192201 A1* | 6/2016 | Wang | H04W 16/14 |
| | | | 455/454 |
| 2016/0278138 A1* | 9/2016 | Chen | H04W 36/0027 |
| 2017/0013470 A1* | 1/2017 | Sun | H04W 16/14 |
| 2017/0055263 A1* | 2/2017 | Tomeba | H04W 16/14 |
| 2017/0064561 A1* | 3/2017 | Tomeba | H04W 16/14 |
| 2017/0094546 A1* | 3/2017 | Chai | H04W 24/10 |
| 2017/0208475 A1* | 7/2017 | Yi | H04W 74/0816 |
| 2017/0289910 A1* | 10/2017 | Islam | H04W 52/0225 |
| 2018/0132143 A1* | 5/2018 | Sirotkin | H04W 88/06 |
| 2018/0199380 A1* | 7/2018 | Itagaki | H04M 11/00 |
| 2018/0220257 A1* | 8/2018 | Bhattad | H04W 4/70 |
| 2018/0255515 A1* | 9/2018 | Gupta Hyde | H04W 52/0235 |
| 2018/0279350 A1* | 9/2018 | Jiang | H04W 28/04 |
| 2018/0332620 A1* | 11/2018 | Malladi | H04W 74/0816 |

OTHER PUBLICATIONS

International Search Report and Written Opinion based on Application No. PCT/US2017/042301 (11 pages) dated Oct. 17, 2017.
3GPP TR 36.889 V13.0.0, 3rd Generation Partnership Project, Technical Specification Group Radio Access Network, Study on Licensed-Assisted Access to Unlicensed Spectrum, Chapters 5-7, 2015, pp. 34-45, Release 13, 3GPP, Valbonne, France.

* cited by examiner

FIG. 4
400
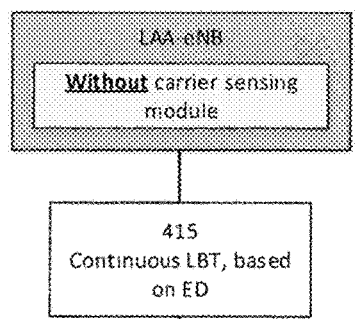
410
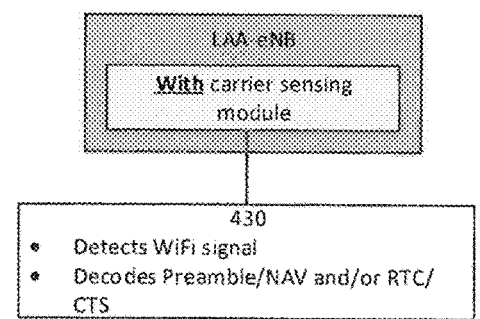
420
415
Continuous LBT, based on ED
430
- Detects WiFi signal
- Decodes Preamble/NAV and/or RTC/CTS
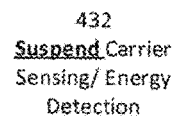
432
Suspend Carrier Sensing/ Energy Detection
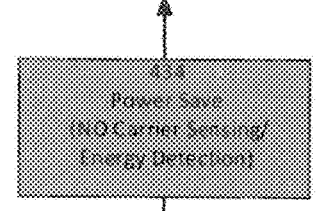
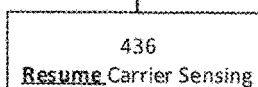
436
Resume Carrier Sensing

COMMUNICATION DEVICE AND METHOD FOR WIRELESS COMMUNICATIONS

TECHNICAL FIELD

Various aspects of this disclosure relate generally to a method and a device for wireless communications.

BACKGROUND

Release 13 of the Third Generation Partnership Project (3GPP) supports Licensed Assisted Access (LAA) in downlink. 3GPP has implemented a mandatory Listen Before Talk (LBT) mechanism for LAA evolved Node Bs (eNodeBs or eNBs) based on energy detection methods to be able to use the unlicensed channel and co-exist with WiFi access points (APs). At the user equipment (UE) side, the UE has to continuously monitor for the physical downlink control channel (PDCCH) containing the downlink control information (DCI) because the UE is unaware of the eNB's transmission opportunities. The DCI contains vital resource assignments intended for the UE.

Both of these situations, i.e. the energy detection at the eNB and the PDCCH monitoring at the UE, are power intensive.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 is a diagram showing how energy detection may be reduced at an eNB in an aspect of this disclosure.

DESCRIPTION

Figure 1:
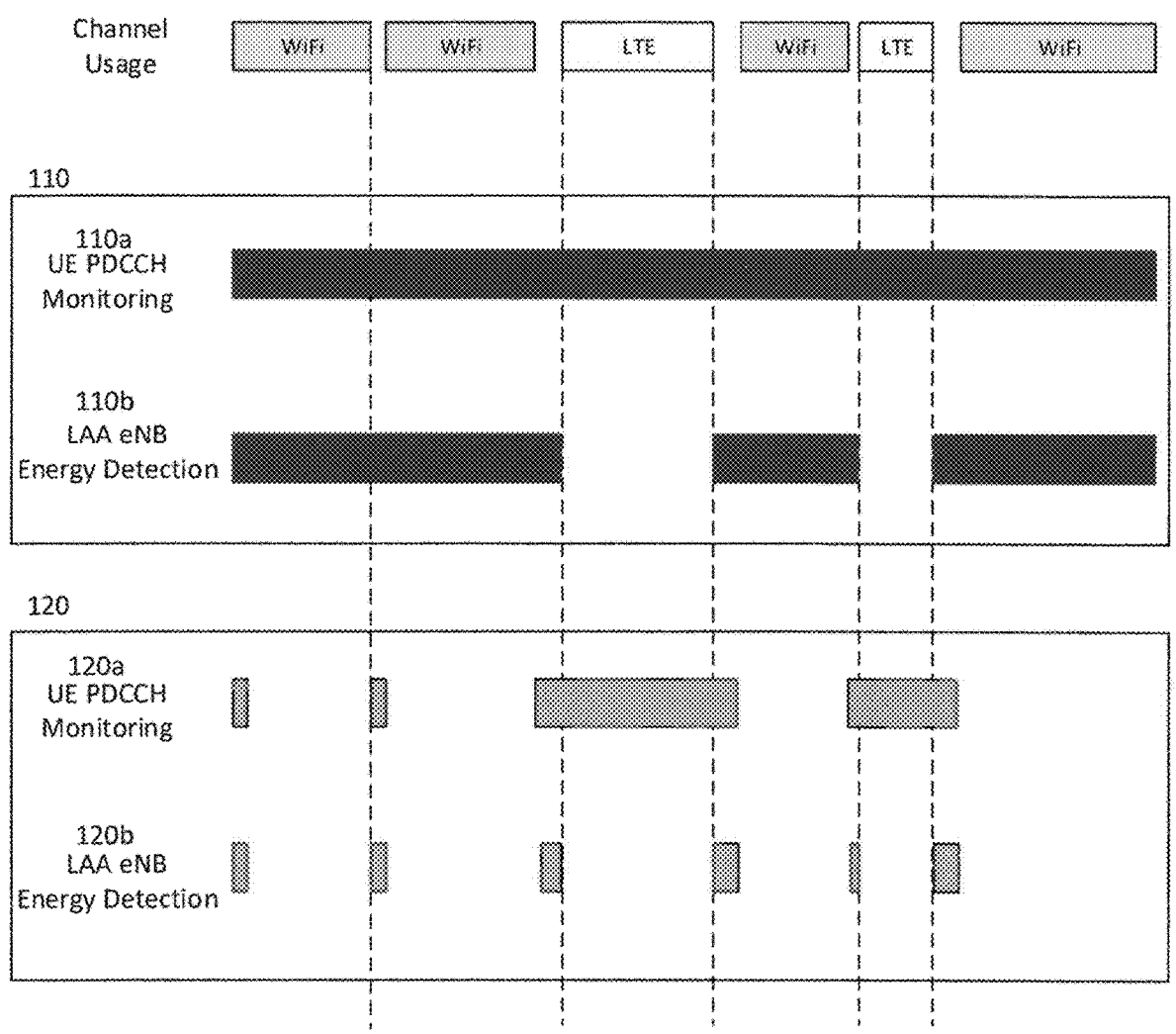
FIG. 1 is a diagram showing the implementation of the processes and devices of this disclosure compared to current methods.

The following details description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of a logic implementing entity, which may be special purpose circuitry or a processor executing software stored in a memory, firmware, and any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, e.g., any kind of computer program, for example, a computer program using a virtual machine code, e.g., Java. Any other kind of implementation of the respective functions which will be described in more detail below may also be understood as a "circuit". It may also be understood that any two (or more) of the described circuits may be combined into one circuit.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

As used herein, a "cell", in the context of telecommunications, may be understood as a sector served by a base station or a test box. Accordingly, a cell may be a set of geographically co-located antennas that correspond to a particular sector of a base station. A base station may thus serve one or more "cells" (or "sectors"), where each cell is characterized by a distinct communication channel. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc. Additionally, a "base station" may be understood as a test box which provides an access point to a mobile communication network in text case scenarios.

For purposes of this disclosure, radio communication technologies may be classified as one of a short range radio communication technology (i.e. radio access technology (RAT)), Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

To accommodate ever-increasing traffic demand, the 3GPP has proposed the Licensed Assisted Access (LAA) mechanism in order to supplement operation of the LTE licensed spectrum with LTE operation in the unlicensed spectrum. An important factor in implementing LAA is coexistence with incumbent systems in the unlicensed spectrum, e.g. WiFi. In order to standardize operation of LTE in the unlicensed spectrum, e.g. in WiFi bands, the Listen Before Talk (LBT) contention protocol was introduced to coexist with other devices operating on the same band. An important factor in the LBT mechanism, i.e. in Energy Detection (ED), is the ED threshold which determines the level at which other transmissions are deemed to be occurring on the medium.

In LBT, the radio transmitter first senses the transmission medium, i.e. the band, and transmits only if it senses that the medium is idle. LBT utilizes energy detection (ED) to determine the presence of other signals on the medium. The eNB's employing LAA have to continuously perform the LBT procedure, i.e. ED. Through current implementations of ED, the UE/eNB can only detect if the communication channel, i.e. the unlicensed spectrum band, is idle or busy for one WiFi slot. The UE/eNB cannot detect how long the channel will remain busy.

Similarly, even though the LTE signal in the unlicensed spectrum is not transmitted continuously, the UE will continuously monitor the unlicensed spectrum for PDCCH as long as the secondary cell is active, a process which is power intensive. In other words, if the unlicensed spectrum band is occupied transmitting WiFi signals, the UE will still monitor the channel for PDDCH. The primary cell is the main cell with which the UE communicates and maintains its connection with the network, e.g. the eNB serving cell. One or more secondary cells may be allocated and activated to the UE to support carrier aggregation for additional bandwidth.

FIG. 1 is a diagram 100 showing the implementation of the processes and devices disclosed herein. It is appreciated that diagram 100 is exemplary in nature and may therefore be simplified for purposes of this explanation.

Diagram 100 displays a comparison of current methods 110 versus methods disclosed in aspects of this disclosure 120. Diagram 100 depicts channel usage of the unlicensed spectrum between two RATs (i.e. WiFi and LTE) on a shared channel.

In current methods 110, the UE continuously performs PDCCH monitoring 110a of the shared channel. For example, the UE continuously monitors the secondary channel, i.e. the unlicensed frequency band in this example, even though the channel may transmitting communications via another radio access technology (RAT), i.e. WiFi. By doing so, the UE expends unneeded power by monitoring the channel for PDCCH when there is no possibility that there will be PDCCH broadcast on the channel since another RAT is currently using the channel.

Similarly, the eNB (or, in other cases, the UE) continuously performs Energy Detection (ED) 110b of the shared channel, i.e. the unlicensed frequency band, in order to implement the LBT mechanism. As demonstrated by 100b, the eNB employs ED to continuously monitor the channel while it is not being used for its own purposes, i.e. LTE, a process which is very power intensive.

In aspects of this disclosure 120, the PDDCH monitoring and ED are significantly reduced, thereby conserving power at both the UE and eNB side, by implementing a carrier sensing module at the UE and the eNB. The carrier sensing module may include circuitry/hardware and corresponding software to detect another other RAT, e.g. a WiFi packet; decode it; and extract an information from the decoded signal in order to suspend the PDCCH monitoring and/or ED. Each WiFi packet (i.e. each 802.11 PHY layer packet) contains a preamble, a header, and a payload data. The preamble allows a receiver to synchronize the time and frequency of the signal, the header provides information about the packet configuration, while the payload data contains the data being transmitted.

The underlying principle of this disclosure is a carrier sensing module at the UE or the eNB that receives the WiFi signal, decodes it, and from the WiFi packet preamble, is able to extract a duration information in order to assess for how long the channel will remain busy with a continuous WiFi transmission. This duration information may be obtained from the Network Allocation Vector (NAV), a virtual timer mechanism used in wireless protocols such as IE 802.11, i.e. WiFi. The Media Access Control (MAC) layer frame headers contain a duration field that specifies the transmission time required for the frame. If the NAV contains a value, it can be thought of as a counter, which will count down to zero from that value at a uniform rate. In other words, when the NAV value is non-zero, the channel will be busy, and when the NAV value is zero, the channel is idle and available to use for other RATs, e.g. by the UE or the eNB to send and/or receive LTE transmissions. Once the carrier sensing module determines the NAV, it can suspend the PDCCH monitoring or ED during the duration set by the NAV in order to conserve power at the UE and/or the eNB.

By implementing the carrier sensing module, the UE can suspend PDCCH monitoring for long durations of time 120a in order to save power. While the UE may expend extra power due to the intermittent carrier sensing, the extra power consumption from the carrier sensing at the UE is much smaller compared performing continuous PDCCH monitoring, yielding net power savings.

Figure 2:
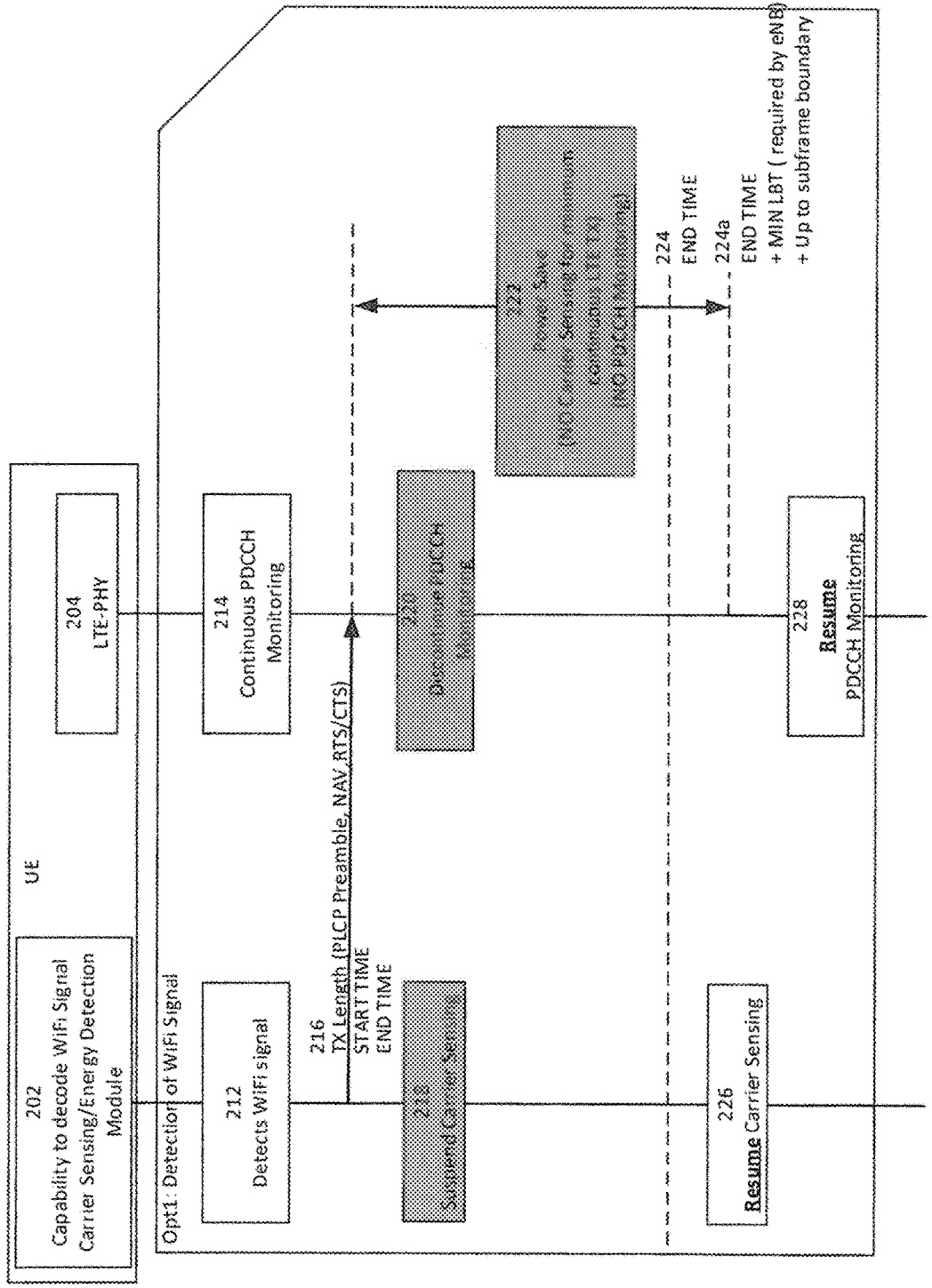
FIG. 2 is a diagram showing how PDCCH monitoring and carrier sensing may be reduced at a UE in an aspect of this disclosure

FIG. 2 is a diagram 200 showing how PDCCH monitoring is reduced in an aspect of this disclosure. It is appreciated that diagram 200 is exemplary in nature and may thus be simplified for purposes of this explanation.

In diagram 200, the LAA UE has a carrier sensing module that is capable of decoding a received WiFi signal and use the decoded information in order to implement efficient carrier sensing/energy detection (ED). Since LAA is supported in the UL in 3GPP Release 14, it will be mandatory for UE to have a module for ED.

Diagram 200 shows an option (i.e. Opt1) in an aspect of this disclosure where the WiFi signal is detected at the UE. The carrier sensing module 202 at the UE detects a WiFi signal 212 while the LTE PHY layer 204 of the UE performs continuous PDCCH monitoring of the channel 204. The carrier sensing module decodes the WiFi packet 216, including the physical layer convergence protocol (PLCP) preamble, from which the carrier sensing module determines the NAV and/or the Request to Send/Clear to Send (RTS/CTS) frames. The RTS/CTS is a mechanism used by 802.11 wireless networking protocol to reduce frame collisions presented by the hidden node problem. Each of the RTS and the CTS frame fields include a duration field, among other fields. After determining the duration information from the WiFi signal received in 212, the carrier sensing module sends the duration information, which may include a START TIME and END TIME, to the LTE PHY layer in 216, at which point the UE can suspend carrier sensing 218 and discontinue PDCCH monitoring 220 until at least the END TIME 224, resulting in a power save 222.

Since the channel can be used by the LAA eNB only after minimum LBT and at the sub-frame boundary or the 7th symbol of the subframe, PDCCH monitoring can be suspended for more than the END TIME, and may be extended until 224a.

In LAA, the blind PDCCH monitoring currently used is very expensive as the transmission can start in either symbol 0 or symbol 7 of the LTE subframe. This monitoring keeps the reception (RX) chain for the carrier ON for almost the entirety of the subframe. The intermittent carrier sensing module introduced in this disclosure consumes less power compared to this blind PDCCH monitoring. The NAV value can be as larger as 32.767 ms. By implementing the carrier sensing module of this disclosure, a significant amount of power may be saved.

Figure 3:
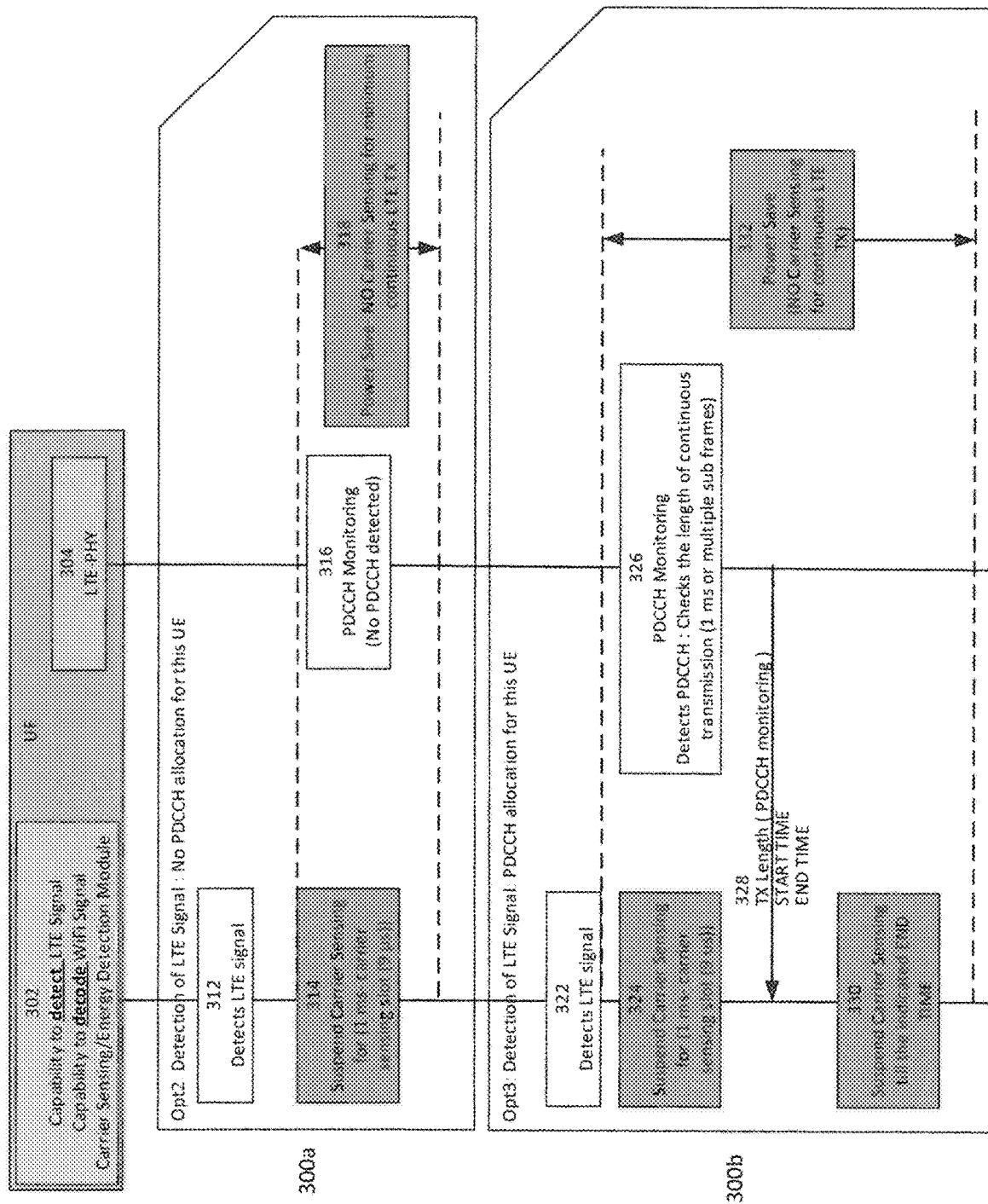
FIG. 3 is a diagram showing how carrier sensing is reduced at a UE in an aspect of this disclosure

FIG. 3 shows a diagram 300 explaining other options for suspending PDCCH monitoring in an aspect of this disclosure. The carrier sensing module in 300 can suspend carrier sensing/PDCCH monitoring based on the detection of the LTE signal in the unlicensed band. It is appreciated that diagram 300 is exemplary in nature and may thus be simplified for purposes of this explanation.

The first example 300a in diagram 300 shows an option 2 (Opt2) where the UE detects an LTE signal in the situation where there is no PDCCH allocated 316 to the UE. According to Release 13 of the 3GPP, the LAA eNB shall transmit at least one complete subframe optionally preceded or proceeded by full or partial subframes. Accordingly, whenever an LTE signal is detected 312 by the UE, i.e. meeting the 3GPP specified energy threshold, the UE can assume that the carrier sensing/ED may be suspended for 1 ms 314, resulting in a power save 318 due to the suspension of the carrier sensing/ED monitoring.

The second example 300b in diagram 300 shows another option (Opt3) where the UE detects the LTE signal in a situation where there is PDDCH allocated 326 to the UE. Upon detecting the LTE signal in 322, the UE can suspend carrier sensing/ED 324, similarly as shown in 314. However, in this case, the PDCCH monitoring 326 detects PDCCH allocated for the UE and checks the length of continuous transmission, which may be 1 subframe (i.e. 1 ms) or multiple subframes. The length of PDCCH allocation may be more than 1 ms as partial subframes are indicated one subframe in advance. Accordingly, the LTE PHY layer would be able to send this duration information 328 to the carrier sensing module, which would result in additional time for which carrier sensing /ED can be suspended 330, resulting in total power savings 332.

FIG. 4 is a chart 400 comparing the behavior of an LAA eNB meeting the 3GPP requirements 410 versus an LAA eNB disclosed in an aspect of this disclosure 420. It is appreciated that chart 400 is exemplary in nature and may therefore be simplified for purposes of this explanation.

In 410, an LAA eNB without the carrier sensing module of this disclosure is shown, i.e. an LAA eNB meeting the requirements specified in 3GPP. The eNB continuously employs the LBT mechanism based on ED 415 while it is not actively using the communication channel (also shown in 110b in FIG. 1). This mechanism leads to large amounts of power consumption.

In 420, an LAA eNB with the carrier sensing module of this disclosure is shown. The carrier sensing module is configured to detect the WiFi signal and decode the preamble for the NAV and/or decode the RTC/CTS for their respective duration fields 430. In this manner, the carrier sensing module is able to determine a length of time of the continuous WiFi transmission and can suspend the carrier sensing/ED for this length of time, e.g. until an END TIME as determined by the carrier sensing module from the NAV. This results in a power save for a span of 434. Once the duration is achieved, e.g. the NAV value is zero, the eNB will resume carrier sensing 436, at which point the process shown by 430-432 may be repeated.

Figure 5:
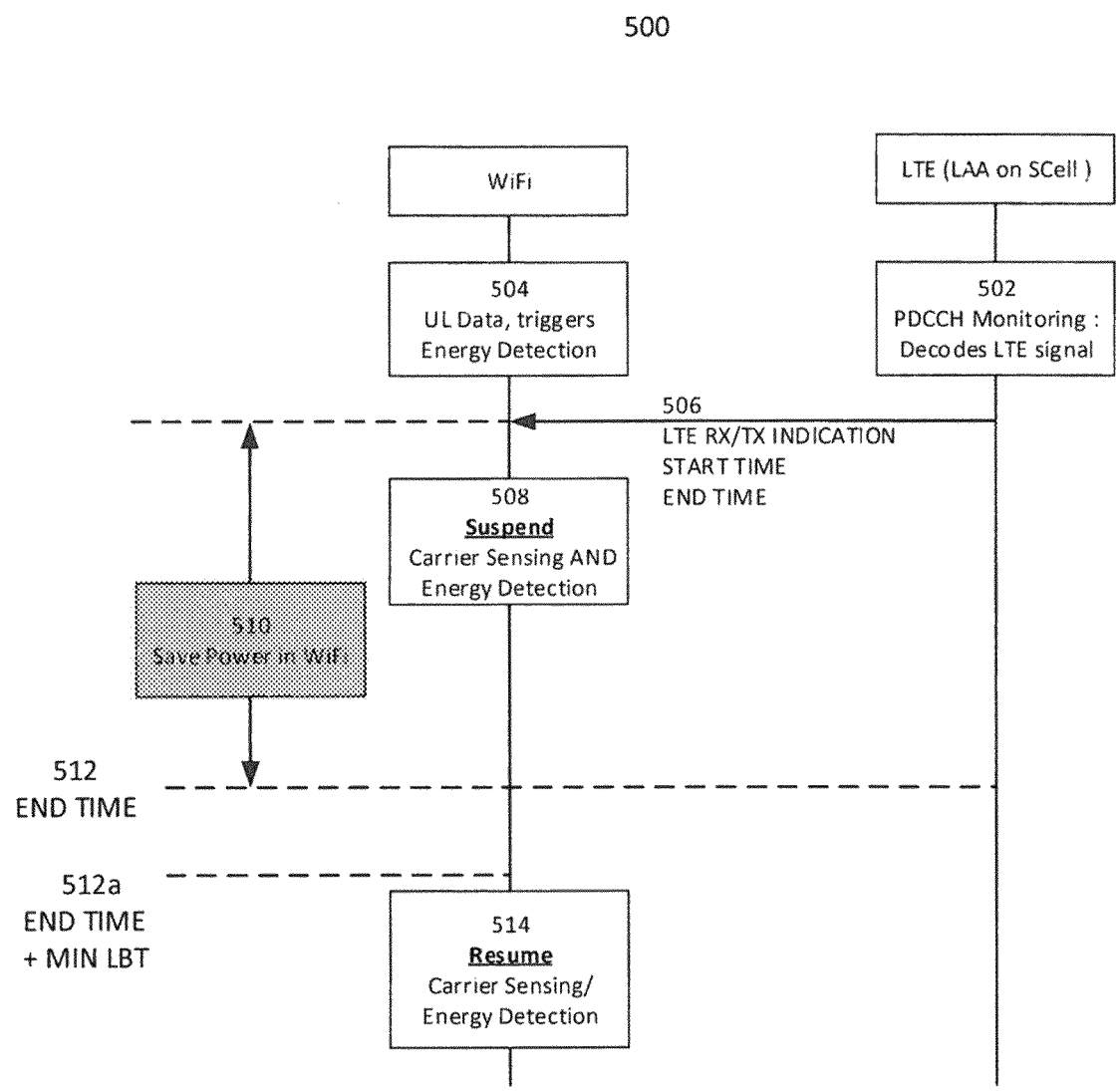
FIG. 5 is a chart depicting a carrier sensing module in an aspect of this disclosure may be implemented at the WiFi side when LTE and WiFi operate in the same communication channel.

FIG. 5 is a chart 500 showing how a carrier sensing module in an aspect of this disclosure may be implemented at the WiFi side, i.e. at the WiFi router or the WiFi hardware/circuitry of the UE, with a common carrier sensing method when LTE and WiFi operate in the same channel. It is appreciated that chart 500 is exemplary in nature and may therefore be simplified for purposes of this explanation.

In 502, the PDCCH monitoring decodes the LTE signal. Uplink (UL) data on the Wifi Side triggers Energy Detection (ED) 504. Upon decoding the LTE signal in 502, the LTE layer sends a reception/transmission (Rx/Tx) indication 506 to the WiFi layer with a duration information including how long the LTE communication will occupy the communication channel, i.e. a duration for which carrier sensing and/or ED may be suspended. This may include a START TIME and/or END TIME.

Once the WiFi layer received the indication, it can suspend carrier sensing and energy detection (ED) 508 until at least the END TIME 512 and possibly until the END TIME plus the minimum time needed for the LBT mechanism 512a. Therefore, power can be saved for at least the span indicated by 510. Once the END TIME (or END TIME+ MIN LBT) is reached, the WiFi layer may resume with carrier sensing and ED 514.

Figure 6:
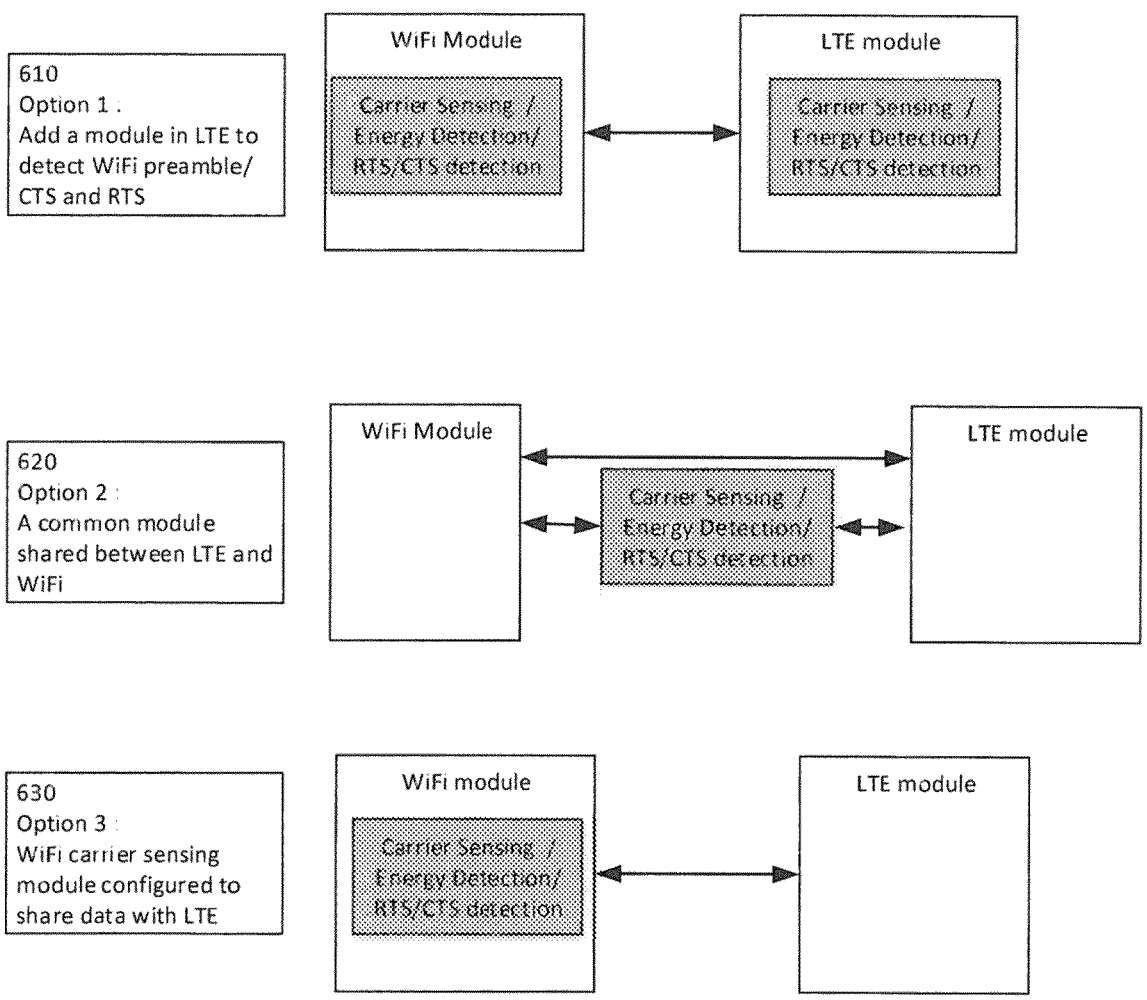
FIG. 6 shows three options for implementing the carrier sensing module in an aspect of this disclosure.

FIG. 6 depicts different options 610-630 for implementing the carrier sensing module in an aspect of this disclosure. It is appreciated that options 610-630 are exemplary in nature and may be simplified for purposes of this explanation.

In one option in an aspect of this disclosure 610, the carrier sensing module may be added to the LTE module. In this option, both the WiFi and LTE modules may be capable of carrier sensing, energy detection (ED), and RTS/CTS detection. Both modules may be further capable of decoding a received RAT signal in order to determine a duration information and suspend carrier sensing/ED and/or PDCCH monitoring for the appropriate RAT.

In another option in an aspect of this disclosure 620, the carrier sensing module may be implemented at a common module shared between LTE and WiFi. The carrier sensing module may be configured to operate in at least substantially the same manner as the carrier sensing module described in 610 above.

In another option in an aspect of this disclosure 630, the WiFi carrier sensing module may be configured to share data (i.e. NAV duration data) with LTE. The carrier sensing module may be configured to operate in at least substantially the same manner as the carrier sensing module described in 610 above.

Figure 7:
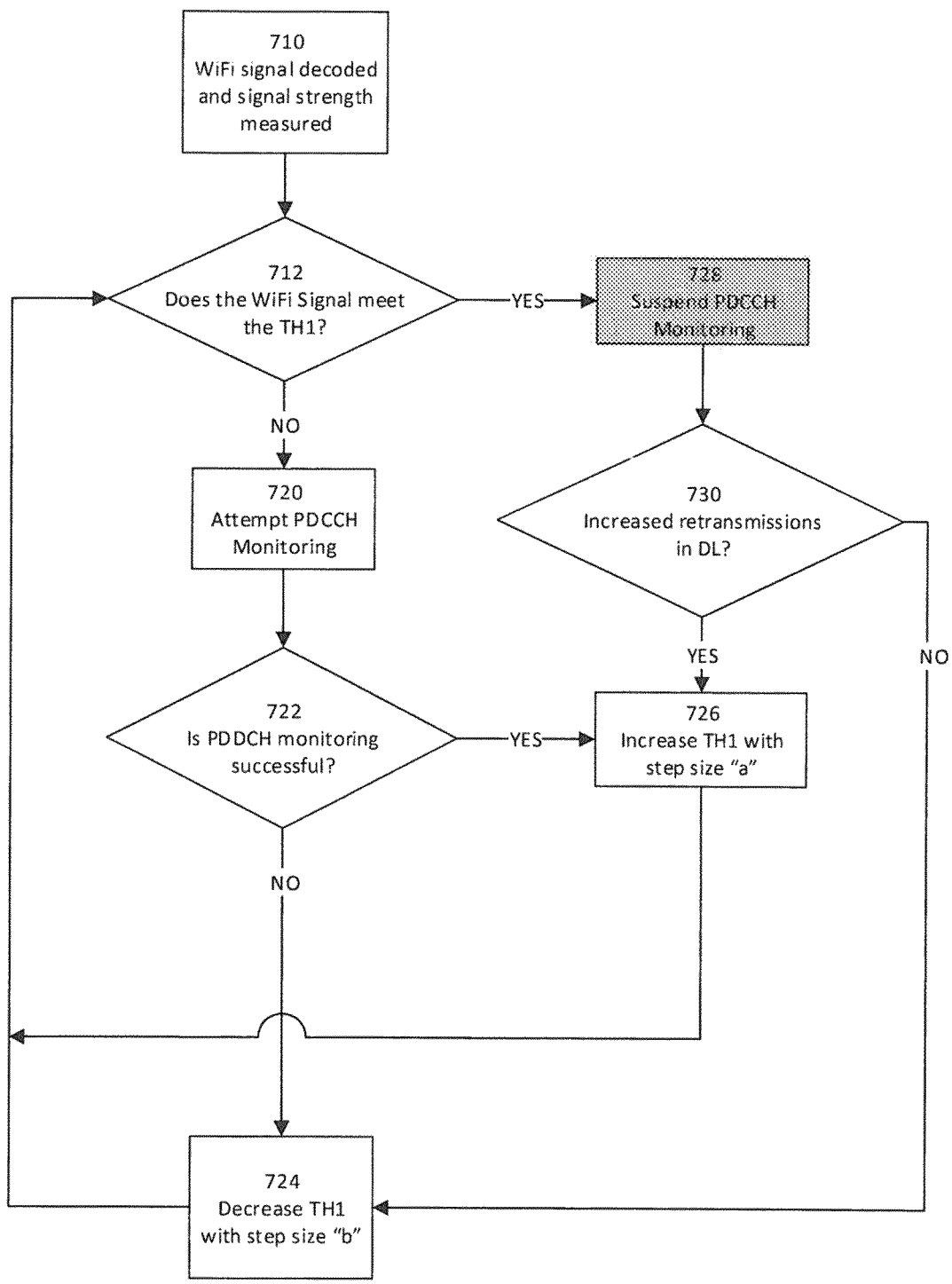
FIG. 7 is a flowchart which accounts for the effect of hidden nodes before suspending PDCCH monitoring in an aspect of this disclosure.

FIG. 7 is a flowchart 700 showing an aspect of this disclosure which accounts for the effect of hidden nodes (hidden node problem shown in FIG. 7A) before suspending PDCCH monitoring. It is appreciated that flowchart 700 is exemplary in nature and may be simplified for purposes of this explanation.

Figure 7A:
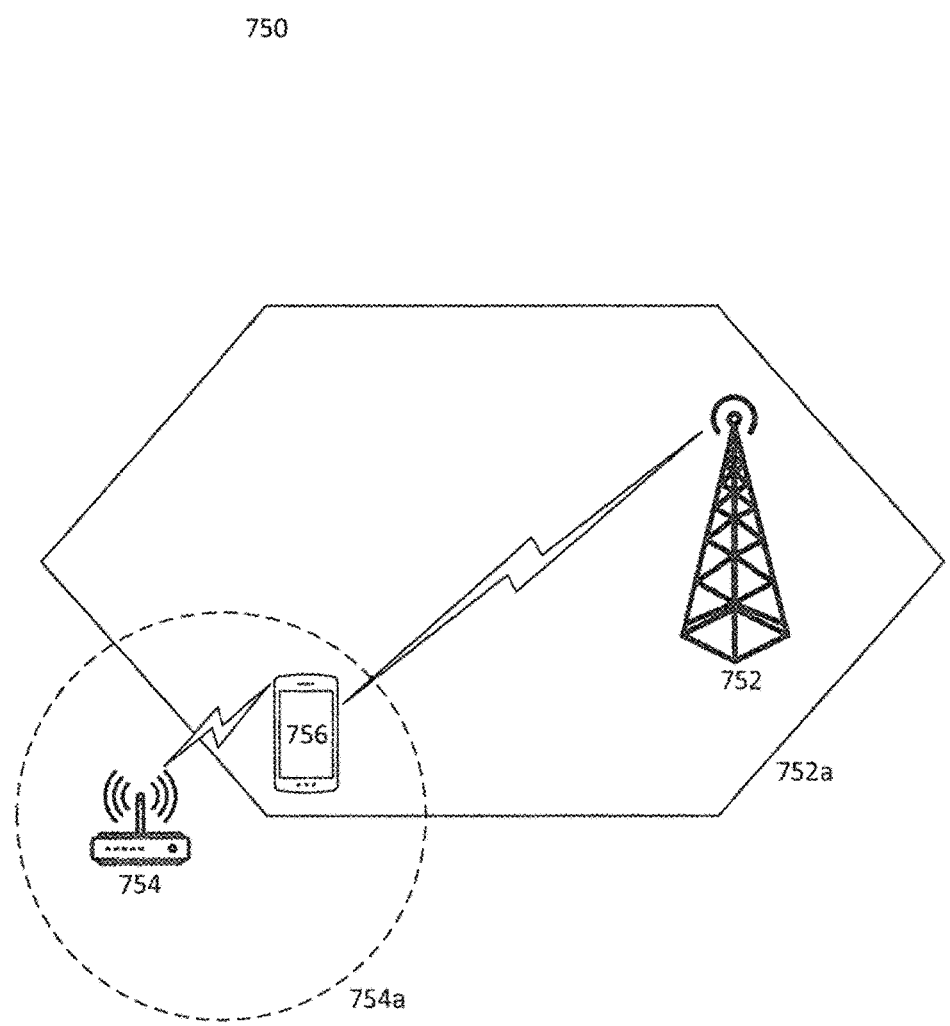
FIG. 7A shows a network scenario where the process described in FIG. 7 may be implemented.

FIG. 7A shows a network 750 depicting a hidden node problem existing between the eNB 752 (and its corresponding cell 752a) and a WiFi Access point (AP) 754 (and its corresponding coverage region 754a). It is appreciated that network 750 is exemplary in nature and may be simplified for purposes of this explanation.

The UE 756 may perform the LBT mechanism, i.e. ED, and determine that the channel (i.e. the unlicensed frequency band) is occupied by a signal from WiFi AP 754. However, the WiFi signal may not reach eNB 752, and as a result, eNB 752 may find the channel idle. Therefore, eNB 752 may schedule PDCCH for the UE 756. In order to account for this scenario of incorrectly suspending PDCCH monitoring at the UE 756, the UE may be configured to implement the process shown in flowchart 700 of FIG. 7.

After the received WiFi signal is decoded and its signal strength is measured 710, the UE is configured to compare the WiFi signal strength to a threshold (TH1) 712, i.e. an ED threshold. TH1 determines the level of sensitivity to declare the existence of existing WiFi communications. The initial value of TH1 should be higher than the LBT thresholds defined in 3GPP TR 36.889 to ensure that PDCCH monitoring is not suspended unless the WiFi signal is of adequate strength.

If the UE determines that the WiFi signal does not meet the TH1 in 712 (i.e. the strength of the WiFi signal is less than the threshold), the UE attempts to monitor the communication channel for PDCCH 720. If the PDCCH monitoring is successful, i.e. the UE receives PDCCH from eNB, the UE increases TH1 by a step size "a" 726 to minimize the chance of suspending PDCCH monitoring. If the PDCCH monitoring is not successful, i.e. the UE does not receive PDCCH from the eNB, the UE decreases TH1 by step size "b" 724 to increase the chance of suspending PDCCH monitoring. In either case, the UE compares the modified TH1 (i.e. TH1+a or TH1−b) to the WiFi signal strength again in 712 and repeats the process.

If the WiFi signal meets the TH1 in 712 (i.e. the strength of the WiFi signal is greater than or equal to the threshold), the UE is configured to suspend PDCCH monitoring 728. If the UE detects an increase in retransmissions in the LTE downlink (DL) 730, i.e. when there are hybrid automatic repeat request (HARQ) retransmissions or radio link control (RLC) layer retransmissions, this means that the sensitivity of TH1 was too low. The UE is configured to increase TH1 by a step size "a" 726 to minimize the chance of incorrectly suspending PDCCH monitoring. If there is no increase in retransmission in the DL, the UE is configured to decrease TH1 by a step size "b" 724 in order to increase the chance of suspending PDCCH monitoring. In either case, the UE compares the modified TH1 (i.e. TH1+a or TH1−b) to the WiFi signal strength again in 712 and repeats the process.

As shown by flowchart 700, the UE, in an aspect of this disclosure, is able to implement hardware and/or software in order to tune the threshold by which determine whether PDCCH monitoring may be suspended. Furthermore, step sizes "a" and "b" may be adjusted in order to increase performance, e.g. by adjusting the step size by a predetermined percentage according to a certain deployment.

Figure 8:
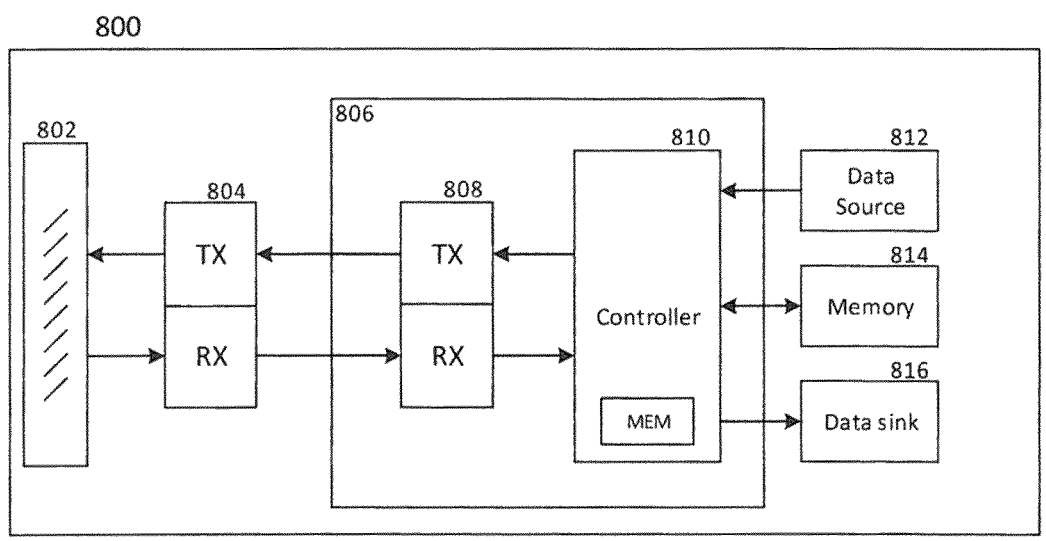
FIG. 8 is an internal configuration of a communication device in an aspect of this disclosure.

FIG. 8 shows a communication device 800 which may be configured to suspend PDCCH monitoring and/or ED/carrier sensing. It is appreciated that communication device 800 is exemplary in nature and may thus be simplified for purposes of this explanation. For example, communication device 800 may include other components not pictured or described in the ensuing description.

As shown in FIG. 8, communication device 800 may include antenna system 802, radio frequency (RF) transceiver 804, baseband modem 806 (including physical layer processing circuit 808 and controller 810), data source 812, memory 814, and data sink 816.

These components may be implemented as separate components. However, as depicted in FIG. 8, it is appreciated that the configuration of communication device 800 is for purposes of explanation, and accordingly, one or more of the aforementioned components of communication device 800 may be integrated into a single equivalent component or divided into multiple components with collective equivalence. It is also appreciated that communication device 800 may have one or more additional components, such as hardware, software, or firmware elements. For example, communication device 800 may also include various additional components including processors, microprocessors, at least one memory component, subscriber identity module(s) (SIM), at least one power supply, peripheral device(s) and other specialty or generic hardware, processors, or circuits, etc., in order to support a variety of additional operations. The at least one memory component of communication device 800 may be configured to store program instructions. Communication device 800 may also include a variety of user input/output devices, such as display(s), keypad(s), touchscreen(s), speaker(s), microphone(s), button(s), camera(s), etc.

In an abridged operational overview, communication device 800 may transmit and receive radio signals according to multiple different wireless access protocols or radio access technologies (RATs), for example, any one or combination of: Long-Term Evolution (LTE), Global System for Mobile Communications (GSM), Universal Mobile Telecommunications System (UMTS), Code Division Multiple Access (CDMA), Wideband CDMA (W-CDMA), Wi-Fi, Wireless Local Area Network (WLAN), Bluetooth, etc. Baseband modem 806 may direct such communication functionality of communication device 800 according to the communication protocols associated with each RAT, and may execute control over antenna system 802 and RF transceiver 804 in order to transmit and receive radio signals according to the formatting and scheduling parameters defined by each communication protocol.

Communication device 800 may transmit and receive radio signals with antenna system 802, which may be a single antenna or an antenna array composed of multiple antennas and may additionally include analog antenna combination and/or beamforming circuitry. In the receive path (RX), RF transceiver 804 may receive analog radio frequency signals from antenna system 802 and perform analog and digital RF front-end processing on the analog radio frequency signals to produce digital baseband samples to provide to baseband modem 804. RF transceiver 804 may accordingly include analog and digital reception circuitry including amplifiers (e.g. a Low Noise Amplifier, filters, RF demodulators), and analog-to-digital converters (ADCs) to convert the received radio frequency signals to digital baseband samples. In the transmit path (TX), RF transceiver 804 may receive digital baseband samples from baseband modem 806 and perform analog and digital RF front-end processing on the digital baseband samples to produce analog radio frequency signals to provide to antenna system 802 for wireless transmission. RF transceiver 804 may thus include analog and digital transmission circuitry including amplifiers (e.g. a Power Amplifier, filters, RF modulators), and digital-to-analog converters (DACs) to mix the digital baseband samples received from baseband modem 806 to produce the analog radio frequency signals for wireless transmission by antenna system 802. Baseband modem 806 may control the RF transmission and reception of RF transceiver 804, including specifying transmit and receive radio frequencies for operation of RF transceiver 804.

As shown in FIG. 8, baseband modem 806 may include a physical layer processing circuit 808, which may perform physical layer (Layer 1) transmission and reception (TX/RX) processing to prepare outgoing transmit data provided by controller 810 for transmission via RF transceiver 804 and prepare incoming received data provided by RF transceiver 804 for processing by controller 810. The physical layer processing circuit 808 may accordingly perform one or more of error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. The physical layer processing circuit 808 may be structurally realized as hardware logic, e.g. as an integrated circuit or FPGA, as software logic, e.g. as program code defining arithmetic, control, and I/O instructions stored in a non-transitory computer-readable storage medium and executed on a processor, or as a combination of hardware and software logic. Although not explicitly shown in FIG. 8, the physical layer processing circuit 808 may include a control circuit such as a processor configured to control the various hardware and software processing components of the physical layer processing circuit 808 in accordance with physical layer control logic defined by the communications protocol for the relevant RATs. Furthermore, while the physical layer processing circuit 808 is depicted as a single component in FIG. 8, the physical layer processing circuit 808 may be collectively composed separate sections of physical layer processing circuitry where each respective section is dedicated to the physical layer processing of a particular RAT.

Communication device 800 may be configured to operate according to one or more RATs, which may be directed by controller 810. Controller 810 may thus be responsible for controlling the radio communication components of communication device 800 (antenna system 802, RF transceiver 804, and the physical layer processing circuit 808) in accordance with the communication protocols of each supported RAT, and accordingly may represent the Access Stratum (AS) and Non-Access Stratum (NAS) (encompassing Layer 2 and Layer 3) of each supported RAT. Controller 810 may be structurally embodied as a protocol processor configured to execute protocol software retrieved from controller memory MEM and subsequently control the radio communication components of communication device 800 in order to transmit and receive communication signals in accordance with the corresponding protocol control logic defined in the protocol software.

Controller 810 may therefore be configured to manage the radio communication functionality of communication device 800 in order to communicate with the various radio and core network components of a network, and accordingly may be configured according to the communication protocols for both the LTE network and the GSM/UMTS legacy network. Controller 810 may either be a unified controller that is collectively responsible for all supported RATs (e.g. LTE and GSM/UMTS) or may be composed of multiple separate controllers where each controller is a dedicated controller for a particular RAT, such as e.g. a dedicated LTE controller and a dedicated legacy controller (or alternatively a dedicated LTE controller, dedicated GSM controller, and a dedicated UMTS controller). Regardless, controller 810 may be responsible for directing radio communication activity of communication device 800 according to the communication protocols of the LTE and legacy networks. As previously noted regarding the physical layer processing circuit 808, one or both of antenna system 802 and RF transceiver 804 may similarly be partitioned into multiple dedicated components that each respectively correspond to one or more of the supported RATs. Depending on the specifics of each such configuration and the number of supported RATs, controller 810 may be configured to control the radio communication operations of communication device 800 in accordance with a master/slave RAT hierarchical scheme or a multi-SIM scheme.

Communication device 800 may further comprise data source 812, memory 814, and data sink 816, where data source 812 may include sources of communication data above controller 810 (i.e. above the NAS/Layer 3) and data sink 816 may include destinations of communication data above controller 810 (i.e. above the NAS/Layer 3). Such may include, for example, an application processor of communication device 800, which may be configured to execute various applications and/or programs of communication device 800 at an application layer of communication device 800, such as e.g. an Operating System (OS), a User Interface (UI) for supporting user interaction with communication device 800, and/or various user applications. The application processor may interface with baseband modem 806 (as data source 812/data sink 816) as an application layer to transmit and receive user data such as voice data, audio/video/image data, messaging data, application data, basic Internet/web access data, etc., over a the radio network connection(s) provided by baseband modem 806. Data source 812 and data sink 816 may additionally represent various user input/output devices of communication device 800, such as display(s), keypad(s), touchscreen(s), speaker(s), external button(s), camera(s), microphone(s), etc., which may allow a user of communication device 800 to control various communication functions of communication device 800 associated with user data.

Memory 814 may embody a memory component of communication device 800, such as e.g. a hard drive or another such permanent memory device. Although not explicitly depicted in FIG. 8, the various other components of communication device 800 shown in FIG. 8 may additionally each include integrated permanent and non-permanent memory components, such as for storing software program code, buffering data, etc.

It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of baseband modem 806 may be detailed herein substantially in terms of functional operation in recognition that a person of skill in the art may readily appreciate the various possible structural realizations of baseband modem 806 using digital processing circuitry that will provide the desired functionality.

The baseband modem 806 is configured to perform the processes disclosed herein.

Figure 9:
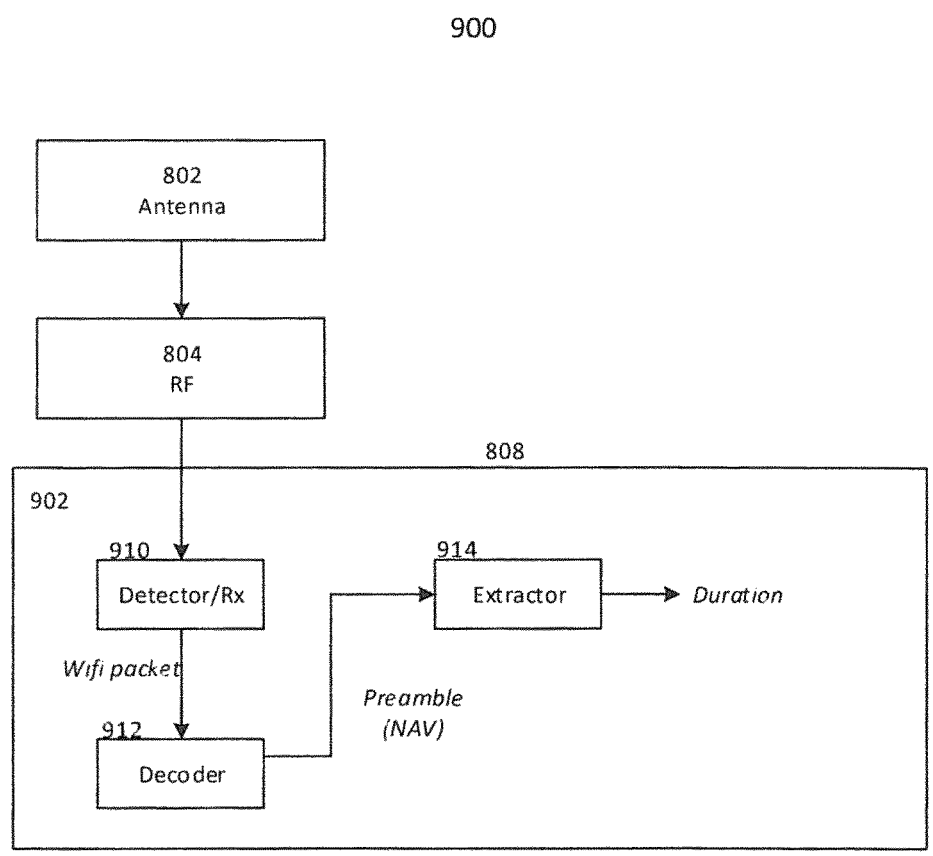
FIG. 9 is an internal circuit arrangement of a communication device in an aspect of this disclosure.

FIG. 9 shows an internal arrangement of a communication device 900 configured to suspend PDDCH monitoring and/or ED detection in an aspect of this disclosure. It is appreciated that communication device 900 is exemplary in nature and may omit certain components that are not directly related to this disclosure. Antenna system 802, RF transceiver 804, and the physical layer processing circuit 808 correspond to the similarly labeled components of FIG. 8. While the ensuing explanation involves WiFi signals, it is appreciated that the disclosure can be applied to other RATs as well.

As shown in FIG. 9, the physical layer processing circuit 808 may include carrier sensing circuitry 902, which may comprise a detector/receiver (RX) circuit 910, a decoding circuit 912, and an extraction circuit 914. Each of the aforementioned components of carrier sensing circuitry 902 may be structurally realized as hardware logic, e.g. as one or more integrated circuits or FPGAs, as software logic, e.g. as one or more processors executing program code that defining arithmetic, control, and I/O instructions stored in a non-transitory computer-readable storage medium, or as a combination of hardware and software logic. Skilled persons will appreciate the possibility to embody each component of carrier sensing circuitry 902 in software and/or software according to the functionality detailed herein.

As will be detailed, in an aspect of this disclosure carrier sensing circuitry 902 may be a circuit arrangement comprising a detector/RX circuit 910 configured to receive a WiFi signal which may comprise a WiFi packet. The decoder circuit 912 is configured to decode the received WiFi signal, i.e. the WiFi packet, in order to produce the WiFi preamble, which may comprise of a duration information such as a NAV. Extractor circuit 914 is configured to extract the duration information, e.g. the NAV, from the preamble in order to produce a duration indicating how long the WiFi signal will continuously employ the communication channel.

The circuitry shown in FIG. 9 may be employed at either the UE (for suspending PDCCH monitoring or ED) or the eNB (for suspending ED).

Figure 10:
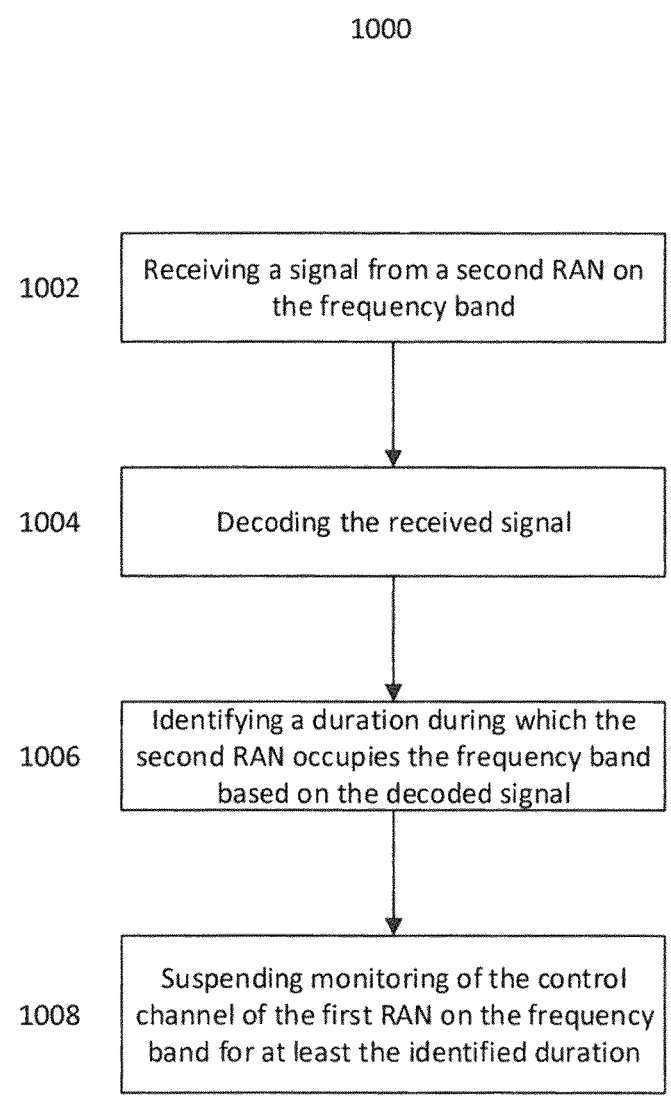
FIG. 10 is a flowchart showing a process by which to suspend monitoring for a control channel of a first radio access network (RAN) on a frequency band shared with a second RAN in an aspect of this disclosure.

FIG. 10 shows a flowchart 1000 in an aspect of this disclosure. It is appreciated that flowchart 1000 is exemplary in nature and may thus be simplified for purposes of this explanation. Flowchart 1000 shows a method for a communication device to suspend monitoring for a control channel of a first radio access network (RAN), e.g. LTE, on a frequency band shared with a second RAN, e.g. WiFi.

In 1002, the communication device receives the signal from the second RAN on the frequency band shared between the two RANs. In 1004, the received signal is decoded. In 1006, a duration, e.g. a NAV value from the preamble of a WiFi packet, during which the second RAN occupies the frequency band is identified based on the decoded signal. In 1008, the communication device suspends the monitoring of the control channel of the first RAN on the frequency band shared by the two RANs for at least the duration identified from the decoded signal.

Figure 11:
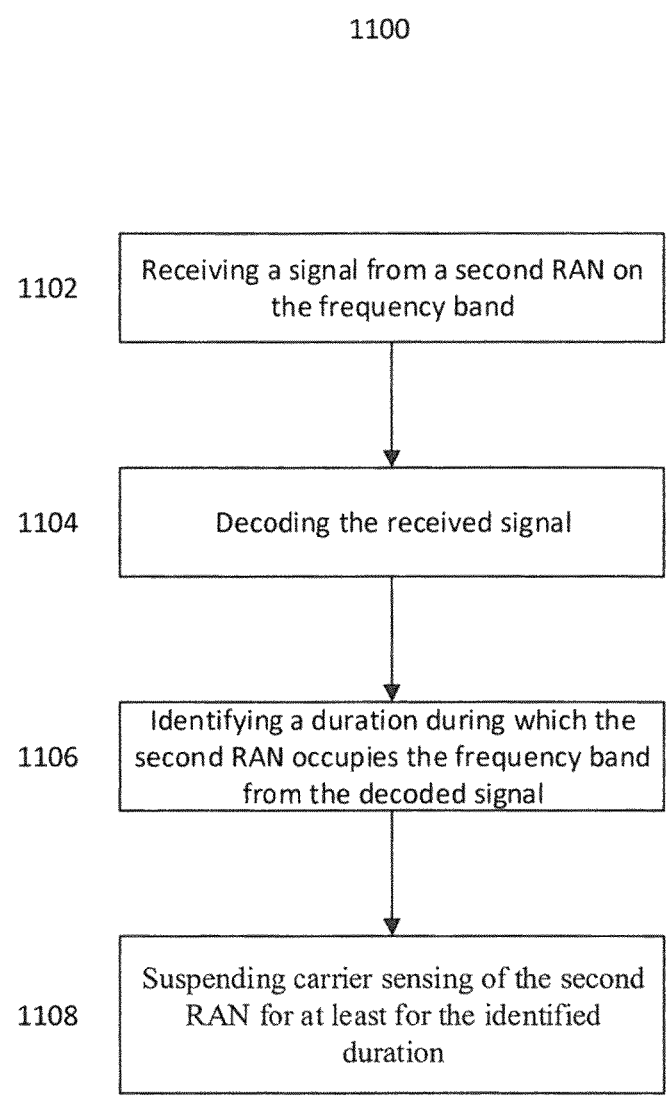
FIG. 11 is a flowchart showing a process for a communication device on a first radio access network (RAN) to suspend detecting for a second RAN on a frequency band shared by the first RAN and the second RAN in an aspect of this disclosure.

FIG. 11 shows a flowchart 1100 in an aspect of this disclosure. It is appreciated that flowchart 1100 is exemplary in nature and may thus be simplified for purposes of this explanation. Flowchart 1100 shows a method for a communication device on a first radio access network (RAN) to suspend detecting for a second RAN on a frequency band shared by the first RAN and the second RAN.

In 1102, the communication device receives a signal from the second RAN on the frequency band shared by the first RAN and the second RAN. This signal may be a WiFi signal comprising a packet with a preamble. The preamble may comprise a NAV value. In 1104, the received signal is decoded. In 1106, a duration during which the second RAN occupies the frequency band is identified from the decoded signal. This duration, for example, may be the NAV value. In 1108, the communication device suspends carrier sensing (i.e. detecting) for the second RAN at least for the duration identified.

In Example 1, a method for suspending monitoring of a control channel of a first radio access network (RAN) on a frequency band shared with a second RAN used in a communication device, the method comprising: receiving a signal from the second RAN on the frequency band; decoding the received signal; identifying a duration during which the second RAN occupies the frequency band based on the decoded signal; and suspending monitoring of the control channel of the first RAN on the frequency band for at least the identified duration.

In Example 2, the subject matter of Example 1 may include resuming monitoring of the control channel of the first RAN on the frequency band after the completion of the identified duration.

In Example 3, the subject matter of Examples 1-2 may include wherein the frequency band is in an unlicensed frequency.

In Example 4, the subject matter of Examples 1-3 may include wherein the first RAN is a long term evolution (LTE) network.

In Example 5, the subject matter of Examples 1-4 may include wherein the control channel is a physical downlink control channel (PDDCH).

In Example 6, the subject matter of Examples 1-5 may include wherein the second RAN is a short range RAN.

In Example 7, the subject matter of Example 6 may include wherein the short range RAN is WiFi.

In Example 8, the subject matter of Example 7 may include wherein the received signal comprises a WiFi packet with a preamble.

In Example 9, the subject matter of Example 8 may include wherein the preamble comprises a Network Allocation Vector (NAV) value.

In Example 10, the subject matter of Example 9 may include wherein identifying the duration during which the second RAN communicates on the frequency band from the decoded signal comprises extracting the NAV value from the preamble.

In Example 11, the subject matter of Example 7 may include wherein the received signal comprises a WiFi packet with a Request to Send/Clear to Send (RTS/CTS) frame comprising a duration value.

In Example 12, the subject matter of Example 11 may include wherein identifying the duration during which the second RAN communicates on the frequency band from the decoded signal comprises extracting the duration value from the RTS/CTS frame.

In Example 13, the subject matter of Examples 1-12 may include suspending detection of the second RAN for at least the identified duration.

In Example 14, a method for monitoring a shared frequency band of a control channel transmitted on a first radio access network (RAN) used in a communication device, the method comprising: measuring a signal strength of a second RAN signal on the shared frequency band; and suspending monitoring of the control channel on the shared frequency band when the measured signal strength is greater or equal to a threshold.

In Example 15, the subject matter of Example 14 may include activating monitoring of the control channel on the shared frequency band when the signal strength is less than the threshold.

In Example 16, the subject matter of Examples 14-15 may include wherein if monitoring for the control channel is suspended on the shared frequency band, further comprising determining if an increase in retransmissions in the shared frequency band occurs.

In Example 17, the subject matter of Example 16 may include wherein if an increase in retransmissions in the shared frequency band occurs, increasing the threshold by a step size.

In Example 18, the subject matter of Example 17 may include comparing the signal strength from the second RAN to the increased threshold.

In Example 19, the subject matter of Example 16 may include wherein if no increase in retransmissions in the shared frequency band occurs, decreasing the threshold by a step size.

In Example 20, the subject matter of Example 19 may include comparing the signal strength of the second RAN with the decreased threshold.

In Example 21, the subject matter of Example 15 may include wherein if monitoring of the control channel is activated on the shared frequency band, determining if the control channel was received at the communication device.

In Example 22, the subject matter of Example 21 may include wherein if the control channel was received at the communication device, increasing the threshold by a step size.

In Example 23, the subject matter of Example 22 may include comparing the signal strength of the second RAN with the increased threshold.

In Example 24, the subject matter of Example 21 may include wherein if no control channel is received at the communication device, decreasing the threshold by a step size.

In Example 25, the subject matter of Example 24 may include comparing the signal strength of the second RAN to the decreased threshold.

In Example 26, the subject matter of Examples 14-25 may include wherein the control channel is a physical downlink control channel (PDCCH).

In Example 27, the subject matter of Examples 14-26 may include wherein the first RAN is a long term evolution (LTE) network.

In Example 28, the subject matter of Examples 14-27 may include wherein the second RAN is a short range RAN.

In Example 29, the subject matter of Example 28 may include wherein the short range RAN is a WiFi network.

In Example 30, a method for suspending carrier sensing of a second radio access network (RAN) on a frequency band shared with a first RAN used in a communication device, the method comprising receiving a signal of the second RAN on the frequency band; decoding the received signal; identifying a duration during which the second RAN occupies the frequency band based on the decoded signal; and suspending carrier sensing of the second RAN for at least for the identified duration.

In Example 31, the subject matter of Example 30 may include activating carrier sensing of the second RAN on the frequency band after the completion of the identified duration.

In Example 32, the subject matter of Examples 30-31 may include wherein the communication device is an Evolved Node B (eNB).

In Example 33, the subject matter of Example 32 may include wherein the first RAN is a long term evolution (LTE) network.

In Example 34, the subject matter of Examples 30-33 may include wherein the second RAN is a short range RAN.

In Example 35, the subject matter of Example 34 may include wherein the short range RAN is a WiFi network.

In Example 36, the subject matter of Example 35 may include wherein the received signal comprises a WiFi packet with a preamble.

In Example 37, the subject matter of Example 36 may include wherein the preamble comprises a Network Allocation Vector (NAV) value.

In Example 38, the subject matter of Example 37 may include wherein identifying the duration during which the second RAN communicates on the frequency band from the decoded signal comprises extracting the NAV value from the preamble.

In Example 39, the subject matter of Example 36 may include wherein the received signal comprises a WiFi packet with a Request to Send/Clear to Send (RTS/CTS) frame comprising a duration value.

In Example 40, the subject matter of Example 39 may include wherein identifying the duration during which the second RAN communicates on the shared frequency band from the decoded signal comprises extracting the duration value from the RTS/CTS frame.

In Example 41, a circuit arrangement for a communication device, the circuit arrangement comprising circuitry configured to receive signals from a first radio access network (RAN) and a second RAN; decode a signal from the first RAN; identify a duration during which the first RAN will occupy a frequency band shared by the first RAN and the second RAN from the decoded signal; and suspend monitoring of the first RAN on the frequency band for at least the determined duration.

In Example 42, the subject matter of Example 41 may include circuitry configured to resume monitoring of the first RAN on the frequency band after the completion of the duration.

In Example 43, the subject matter of Examples 41-42 may include wherein the first RAN is a long term evolution (LTE) network.

In Example 44, the subject matter of Examples 41-43 may include wherein the monitoring on the first RAN is a physical downlink control channel (PDDCH) monitoring.

In Example 45, the subject matter of Examples 41-44 may include wherein the second RAN is a short range RAN.

In Example 46, the subject matter of Example 45 may include wherein the short range RAN is WiFi.

In Example 47, the subject matter of Example 46 may include wherein the decoding circuitry is configured to decode a WiFi packet.

In Example 48, the subject matter of Example 47 may include wherein the decoding circuitry is configured to decode a preamble of the WiFi packet.

In Example 49, the subject matter of Example 48 may include wherein the decoding circuitry is configured to decode a Network Allocation Vector (NAV) value from the preamble.

In Example 50, the subject matter of Example 49 may include wherein the identifying circuitry is configured to identify the NAV value as the duration.

In Example 51, the subject matter of Example 48 may include wherein the decoding circuitry is configured to decode Request to Send/Clear to Send (RTS/CTS) frame comprising a duration value from the WiFi packet.

In Example 52, the subject matter of Example 51 may include wherein the identifying circuitry is configured to identify the RTS/CTS frame duration value as the duration.

In Example 53, a communication device adapted to suspend monitoring of a control channel of a first radio access network (RAN) on a frequency band shared with a second RAN, comprising a first transceiver configured to receive signals from a first radio access network (RAN) on a frequency band shared with a second RAN; and a second transceiver configured to receive signals from the second RAN on the shared frequency band; decoding circuitry configured to decode a signal received on the first RAN; processing circuitry configured to determine a duration during which the first RAN occupies the shared frequency band based on the decoded signal and further configured to suspend monitoring of the first RAN on the shared frequency band for at least the determined duration.

In Example 54, the subject matter of Example 53 may include wherein the processing circuitry is further configured to resume monitoring of the first RAN on the frequency band after the completion of the determined duration.

In Example 55, the subject matter of Examples 53-54 may include wherein the first RAN is a long term evolution (LTE) network.

In Example 56, the subject matter of Examples 53-55 may include wherein the circuit arrangement comprises circuitry configured to monitor for a physical downlink control channel (PDDCH).

In Example 57, the subject matter of Examples 53-56 may include wherein the second RAN is a short range RAN.

In Example 58, the subject matter of Example 57 may include wherein the short range RAN is WiFi.

In Example 59, the subject matter of Example 58 may include wherein the decoding circuitry is configured to decode a WiFi packet.

In Example 60, the subject matter of Example 59 may include wherein the decoding circuitry is configured to decode a preamble of the WiFi packet.

In Example 61, the subject matter of Example 60 may include wherein the decoding circuitry is configured to decode a Network Allocation Vector (NAV) value from the preamble.

In Example 62, the subject matter of Example 61 may include wherein the identifying circuitry is configured to identify the NAV value as the duration.

In Example 63, the subject matter of Example 59 may include wherein the decoding circuitry is configured to decode Request to Send/Clear to Send (RTS/CTS) frame comprising a duration value from the WiFi packet.

In Example 64, the subject matter of Example 63 may include wherein the identifying circuitry is configured to identify the RTS/CTS frame duration value as the duration.

In Example 65, a circuit arrangement for a communication device, the circuit arrangement comprising measuring circuitry configured to measure a signal strength of a first radio access network (RAN) signal on a shared frequency band; and processing circuitry configured to compare the signal strength to a threshold and further configured to at least one of: suspend monitoring of a control channel of the second RAN on the shared frequency band if the signal strength is greater than or equal to the threshold, or activate monitoring of the control channel of the second RAN on the shared frequency band if the signal strength is less than the threshold.

In Example 66, the subject matter of Example 65 may include the processing circuitry further configured to determine if an increase in retransmissions of the second RAN in the shared frequency band occurs.

In Example 67, the subject matter of Example 66 may include wherein if an increase in retransmissions in the shared frequency band occurs, the processing circuitry is further configured to increase the threshold by a step size.

In Example 68, the subject matter of Example 67 may include the processing circuitry further configured to compare the signal strength of the first RAN to the increased threshold.

In Example 69, the subject matter of Example 66 may include wherein if no increase in retransmissions in the shared frequency band occurs, the processing circuitry is further configured to decrease the threshold by a step size.

In Example 70, the subject matter of Example 69 may include the processing circuitry further configured to compare the signal strength of the first RAN to the decreased threshold.

In Example 71, the subject matter of Examples 65-70 may include a determining circuit configured to determine if the control channel was received at the communication device.

In Example 72, the subject matter of Example 71 may include wherein if the determining circuit determines that the control channel was received at the communication device, the determining circuit is configured to increase the threshold by a step size.

In Example 73, the subject matter of Example 72 may include the processing circuitry further configured to compare the signal strength from the first RAN to the increased threshold.

In Example 74, the subject matter of Example 71 may include wherein if the determining circuit determines that the control channel was not received at the communication device, the determining circuit is configured to decrease the threshold by a step size.

In Example 75, the subject matter of Example 74 may include the processing circuitry further configured to compare the signal strength from the first RAN to the decreased threshold.

In Example 76, the subject matter of Examples 65-75 may include wherein the control channel is a physical downlink control channel (PDCCH).

In Example 77, a non-transitory computer readable medium with programmable instructions, which when executed, cause a communication device to suspend monitoring o a control channel of a first radio access network (RAN) on a frequency band shared with a second RAN, comprising receiving a signal from the second RAN on the frequency band; decoding the received signal; identifying a duration during which the second RAN occupies the frequency band based on the decoded signal; and suspending monitoring of the control channel of the first RAN on the frequency band for at least the identified duration.

In Example 78, the subject matter of Example 77 may include resuming monitoring of the control channel of the first RAN on the frequency band after the completion of the identified duration.

In Example 79, the subject matter of Examples 77-78 may include wherein the frequency band is in an unlicensed frequency.

In Example 80, the subject matter of Examples 77-79 may include wherein the first RAN is a long term evolution (LTE) network.

In Example 81, the subject matter of Examples 77-80 may include wherein the control channel is a physical downlink control channel (PDDCH).

In Example 82, the subject matter of Examples 77-81 may include wherein the second RAN is a short range RAN.

In Example 83, the subject matter of Example 82 may include wherein the short range RAN is WiFi.

In Example 84, the subject matter of Example 83 may include wherein the received signal comprises a WiFi packet with a preamble.

In Example 85, the subject matter of Example 84 may include wherein the preamble comprises a Network Allocation Vector (NAV) value.

In Example 86, the subject matter of Example 85 may include wherein identifying the duration during which the second RAN communicates on the frequency band from the decoded signal comprises extracting the NAV value from the preamble.

In Example 87, the subject matter of Example 86 may include wherein the received signal comprises a WiFi packet with a Request to Send/Clear to Send (RTS/CTS) frame comprising a duration value.

In Example 88, the subject matter of Example 87 may include wherein identifying the duration during which the second RAN communicates on the frequency band from the decoded signal comprises extracting the duration value from the RTS/CTS frame.

In Example 89, the subject matter of Examples 77-88 may include further comprising suspending detection of the second RAN for at least the identified duration.

In Example 90, a non-transitory computer readable medium with programmable instructions, which when executed cause a communication device to monitor a shared frequency band for a control channel transmitted on a first radio access network (RAN), comprising measuring a signal strength of a second RAN signal on the shared frequency band; and comparing the signal strength to a threshold; and suspending monitoring of the control channel on the shared frequency band when the measured signal strength is greater or equal to a threshold.

In Example 91, the subject matter of Example 90 may include activating monitoring of the control channel on the shared frequency band when the signal strength is less than the threshold.

In Example 92, the subject matter of Examples 90-91 may include wherein if monitoring for the control channel is suspended on the shared frequency band, determining if there is an increase in retransmissions in the shared frequency band.

In Example 93, the subject matter of Example 92 may include wherein if an increase in retransmissions in the shared frequency band occurs, increasing the threshold by a step size.

In Example 94, the subject matter of Example 93 may include comparing the signal strength from the second RAN to the increased threshold.

In Example 95, the subject matter of Example 92 may include wherein if no increase in retransmissions in the shared frequency band occurs, decreasing the threshold by a step size.

In Example 96, the subject matter of Example 95 may include comparing the signal strength from the second RAN to the decreased threshold.

In Example 97, the subject matter of Example 91 may include wherein if monitoring for the control channel is activated on the shared frequency band, determining if the control channel was received at the communication device.

In Example 98, the subject matter of Example 97 may include wherein if the control channel was received at the communication device, increasing the threshold by a step size.

In Example 99, the subject matter of Example 98 may include comparing the signal strength from the second RAN to the increased threshold.

In Example 100, the subject matter of Example 97 may include wherein if the control channel was not received at the communication device, decreasing the threshold by a step size.

In Example 101, the subject matter of Example 100 may include comparing the signal strength from the second RAN to the decreased threshold.

In Example 102, the subject matter of Examples 90-101 may include wherein the control channel is a physical downlink control channel (PDCCH).

In Example 103, the subject matter of Examples 90-102 may include wherein the first RAN is a long term evolution (LTE) network.

In Example 104, the subject matter of Examples 90-103 may include wherein the second RAN is a short range RAN.

In Example 105, the subject matter of Example 104 may include wherein the short range RAN is a WiFi network.

In Example 106, a non-transitory computer readable medium with programmable instructions when executed cause a communication device on a first radio access network (RAN) to suspend carrier sensing of a second RAN on a frequency band shared by the first RAN and the second RAN, comprising receiving a signal of the second RAN on the frequency band; decoding the received signal; identifying a duration during which the second RAN occupies the frequency band based on the decoded signal; and suspending carrier sensing of the second RAN for at least for the identified duration.

In Example 107, the subject matter of Example 106 may include activating carrier sensing for the second RAN on the frequency band after the completion of the identified duration.

In Example 108, the subject matter of Examples 106-107 may include wherein the communication device is an Evolved Node B (eNB).

In Example 109, the subject matter of Example 108 may include wherein the first RAN is a long term evolution (LTE) network.

In Example 110, the subject matter of Examples 106-109 may include wherein the second RAN is a short range RAN.

In Example 111, the subject matter of Example 110 may include wherein the short range RAN is a WiFi network.

In Example 112, the subject matter of Example 111 may include wherein the received signal comprises a WiFi packet with a preamble.

In Example 113, the subject matter of Example 112 may include wherein the preamble comprises a Network Allocation Vector (NAV) value.

In Example 114, the subject matter of Example 113 may include wherein identifying the duration during which the second RAN communicates on the frequency band from the decoded signal comprises extracting the NAV value from the preamble.

In Example 115, the subject matter of Example 112 may include wherein the received signal comprises a WiFi packet with a Request to Send/Clear to Send (RTS/CTS) frame comprising a duration value.

In Example 116, the subject matter of Example 115 may include wherein identifying the duration during which the second RAN communicates on the shared frequency band from the decoded signal comprises extracting the duration value from the RTS/CTS frame.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement for a communication device, the circuit arrangement comprising circuitry configured to:
receive signals from a first radio access network (RAN) and a second RAN;
decode a signal from the first RAN;
identify a duration during which the first RAN will occupy a frequency band shared by the first RAN and the second RAN from the decoded signal; and
pause carrier sensing on the frequency band for at least the determined duration.

2. The circuit arrangement of claim 1, further comprising circuitry configured to resume monitoring of the first RAN on the frequency band after the completion of the duration.

3. The circuit arrangement of claim 1, wherein the carrier sensing is based on energy detection on the frequency band.

4. The circuit arrangement of claim 1, wherein the second RAN is WiFi.

5. The circuit arrangement of claim 4, wherein the decoding circuitry is configured decode a WiFi packet.

6. The circuit arrangement of claim 1, wherein the decoding circuitry is configured to decode a Physical Downlink Control Channel (PDCCH) transmission from the first RAN and wherein the identifying circuitry is configured to determine the duration based on the PDCCH transmission.

7. The circuit arrangement of claim 1, wherein the decoding circuitry is configured to determine, based on the PDCCH transmission, a length of a continuous transmission, and wherein the identifying circuit is configured to determine the duration as the length of the continuous transmission.

8. A circuit arrangement for a communication device, the circuit arrangement comprising:
detecting circuitry configured to detect a first radio access network (RAN) signal on a shared frequency band based on a first threshold;
measuring circuitry configured to measure a signal strength of the first RAN signal; and
processing circuitry configured to compare the signal strength to a second threshold that is greater than the first threshold and further configured to at least one of:
pause monitoring of a control channel of the second RAN on the shared frequency band if the signal strength is greater than or equal to the second threshold, or
activate monitoring of the control channel of the second RAN on the shared frequency band if the signal strength is less than the second threshold.

9. The circuit arrangement of claim 8, the processing circuity further configured to determine if an increase in retransmissions of the second RAN in the shared frequency band occurs.

10. The circuit arrangement of claim 9, wherein if an increase in retransmissions in the shared frequency band occurs, the processing circuitry is further configured to increase the threshold by a step size.

11. The circuit arrangement of claim 10, the processing circuitry further configured to compare the signal strength of the first RAN to the increased threshold.

12. The circuit arrangement of claim 9, wherein if no increase in retransmissions in the shared frequency band occurs, the processing circuitry is further configured to decrease the threshold by a step size.

13. The circuit arrangement of claim 12, the processing circuitry further configured to compare the signal strength of the first RAN to the decreased threshold.

14. The circuit arrangement of claim 8, further comprising a determining circuit configured to determine if the control channel was received at the communication device.

15. The circuit arrangement of claim 14, wherein if the determining circuit determines that the control channel was received at the communication device, the determining circuit is configured to increase the threshold by a step size.

16. The circuit arrangement of claim 8, wherein the first RAN is a short range RAN and the second RAN is a cellular RAN.

17. A communication device adapted to pause monitoring of a control channel of a first radio access network (RAN) on a frequency band shared with a second RAN, comprising:
a first transceiver configured to receive signals from a first radio access network (RAN) on a frequency band shared with a second RAN; and
a second transceiver configured to receive signals from the second RAN on the shared frequency band;
decoding circuitry configured to decode a signal received on the first RAN;
processing circuitry configured to determine a duration during which the first RAN occupies the shared frequency band based on the decoded signal and further configured to pause carrier sensing on the shared frequency band for at least the determined duration.

18. The communication device of claim 17, wherein the processing circuitry is further configured to resume monitoring of the first RAN on the frequency band after the completion of the determined duration.

19. The communication device of claim 17, wherein the circuit arrangement comprises circuitry configured to monitor for a physical downlink control channel (PDDCH).

20. The communication device of claim 17, wherein the decoding circuitry is configured to decode a Network Allocation Vector (NAV) value from a WiFi packet, and wherein the identifying circuity is configured to identify the NAV value as the duration.

21. The communication device of claim 17, wherein the decoding circuitry is configured to decode Request to Send/Clear to Send (RTS/CTS) frame comprising a duration value from a WiFi packet, and wherein the identifying circuity is configured to identify the RTS/CTS frame duration value as the duration.

22. A method for pausing monitoring of a control channel of a first radio access network (RAN) on a frequency band shared with a second RAN used in a communication device, the method comprising:
monitoring a control channel for the first RAN on the frequency band;
receiving a signal from the second RAN on the frequency band;
decoding the received signal;
identifying a duration during which the second RAN occupies the frequency band based on the decoded signal; and
pausing the monitoring of the control channel of the first RAN on the frequency band for at least the identified duration.

23. The method of claim 22, further comprising resuming monitoring of the control channel of the first RAN on the frequency band after the completion of the identified duration.

24. The method of claim 22, wherein the control channel is a physical downlink control channel (PDDCH).

25. The method of claim 22, wherein the decoding comprises decoding a WiFi packet with a preamble, wherein the preamble comprises a Network Allocation Vector (NAV)

value, and wherein identifying the duration during which the second RAN communicates on the frequency band from the decoded signal comprises extracting the NAV value from the preamble.

26. The method of claim 22, wherein the receiving and decoding of the signal on the second RAN is performed at a carrier sensor,
- the method further comprising sending, from the carrier sensor, signaling to a physical layer of the first RAN that indicates the duration during which the second RAN occupies the frequency band,
- and wherein the physical layer of the first RAN performs the pausing the monitoring of the control channel for the first RAN.

* * * * *